(12) United States Patent
Zao et al.

(10) Patent No.: US 12,182,298 B2
(45) Date of Patent: Dec. 31, 2024

(54) SYSTEM AND METHOD FOR PERFORMING TRUSTED COMPUTING WITH REMOTE ATTESTATION AND INFORMATION ISOLATION ON HETEROGENEOUS PROCESSORS OVER OPEN INTERCONNECT

(71) Applicant: FiduciaEdge Technologies Co., Ltd., Hsinchu (TW)

(72) Inventors: John Kar-Kin Zao, Toronto (CA); Ching-Chun Huang, Tainan (TW); Ching-Yao Huang, Hsinchu (TW)

(73) Assignee: FIDUCIAEDGE TECHNOLOGIES CO., LTD., Hsinchu (TW)

( * ) Notice: Subject to any disclaimer, the term of this patent is extended or adjusted under 35 U.S.C. 154(b) by 384 days.

(21) Appl. No.: 17/635,591

(22) PCT Filed: Aug. 14, 2020

(86) PCT No.: PCT/CA2020/051115
§ 371 (c)(1),
(2) Date: Feb. 15, 2022

(87) PCT Pub. No.: WO2021/030903
PCT Pub. Date: Feb. 25, 2021

(65) Prior Publication Data
US 2022/0309182 A1 Sep. 29, 2022

Related U.S. Application Data

(60) Provisional application No. 62/887,678, filed on Aug. 16, 2019.

(51) Int. Cl.
*G06F 21/62* (2013.01)
*G06F 21/53* (2013.01)
(Continued)

(52) U.S. Cl.
CPC .......... *G06F 21/6236* (2013.01); *G06F 21/53* (2013.01); *G06F 21/602* (2013.01); *H04L 9/3247* (2013.01); *G06F 2221/2149* (2013.01)

(58) Field of Classification Search
CPC ........ G06F 21/53; G06F 21/57; G06F 21/602; G06F 21/6236; G06F 21/74; G06F 2221/2149; H04L 9/3247
See application file for complete search history.

(56) References Cited

U.S. PATENT DOCUMENTS 9,147,086 B1   9/2015  Potlapally et al.
9,292,712 B2 * 3/2016  Ståhl ..................... G06F 21/725
(Continued)

FOREIGN PATENT DOCUMENTS

CN    108154032 A    6/2018
CN    108737373 A   11/2018
(Continued)

OTHER PUBLICATIONS

Hiroshi Isozaki et al., "Embedded System with Long-term Security Utilizing Hardware Security Function," Information Processing Society of Japan, vol. 56, No. 8, Aug. 2015, pp. 1604-1620.
(Continued)

*Primary Examiner* — Linglan Edwards
(74) *Attorney, Agent, or Firm* — MUNCY, GEISSLER, OLDS & LOWE, P.C.

(57) ABSTRACT

A system and method, for the assurance of authenticity, confidentiality and integrity of the executed programs, the analytic models and the processed data used by heterogeneous processing units such as graphic processing units (GPU), neural processing units (NPU) and video processing units (VPU), etc. that are connected to the central processing unit (CPU) through standard open interconnects such as Ethernet, USB and SPI, etc.

23 Claims, 3 Drawing Sheets

(51) Int. Cl.
*G06F 21/60* (2013.01)
*H04L 9/32* (2006.01)

(56) References Cited

U.S. PATENT DOCUMENTS

| | | | |
|---|---|---|---|
| 10,091,245 | B2 | 10/2018 | O'Hern et al. |
| 10,564,997 | B2* | 2/2020 | Hong ..................... G06F 21/53 |
| 10,754,967 | B1* | 8/2020 | Arora ..................... G06F 21/74 |
| 10,922,441 | B2* | 2/2021 | Mo ......................... G06F 21/53 |
| 2011/0293097 | A1* | 12/2011 | Maino ................. G06F 12/0848 |
| | | | 380/46 |
| 2013/0031374 | A1 | 1/2013 | Thom et al. |
| 2014/0095918 | A1* | 4/2014 | Stahl ..................... G06F 21/725 |
| | | | 713/500 |
| 2015/0002523 | A1 | 1/2015 | Zeng et al. |
| 2016/0080320 | A1 | 3/2016 | Barakat et al. |
| 2016/0117497 | A1 | 4/2016 | Saxena et al. |
| 2018/0060077 | A1 | 3/2018 | Abdulhamid et al. |
| 2018/0129525 | A1* | 5/2018 | Hong ................... G06F 12/1009 |
| 2018/0217941 | A1 | 8/2018 | Horovitz et al. |
| 2019/0220601 | A1 | 7/2019 | Sood et al. |
| 2019/0340393 | A1* | 11/2019 | Mo ......................... G06F 21/554 |
| 2019/0363894 | A1* | 11/2019 | Kumar Ujjwal ...... H04L 9/3268 |
| 2019/0370549 | A1* | 12/2019 | Lai ......................... G06F 3/017 |

FOREIGN PATENT DOCUMENTS

| | | |
|---|---|---|
| JP | 2010517162 A | 5/2010 |
| JP | 2016146195 A | 8/2016 |
| JP | 6417539 B2 | 11/2018 |
| JP | 2019061538 A | 4/2019 |
| TW | I423136 B | 1/2014 |
| TW | I438686 B | 5/2014 |
| WO | WO201872713 A1 | 4/2018 |

OTHER PUBLICATIONS

Paolino, Michele et al., "T-KVM : A Trusted architecture for KVM ARM v7 and v8 Virtual Machines Securing Virtual Machines by means of KVM , TrustZone , TEE and SELinux", Proceeding of the Sixth International Conference on Cloud Computing, GRIDs, and Virtualization, Mar. 23, 2015, pp. 39-45.

Jang, Jinsoo et al., "PrivateZone: Providing a Private Execution Environment Using ARM TrustZone", IEEE Transactions on Dependable and Secure Computing, vol. 15, No. 5, Sep. 1, 2018, pp. 797-810.

Volos, Stavros et al., "Graviton: trusted execution environments on GPUs", OSDI'18: Proceedings of the 13th USENIX Symposium on Operating Systems Design and Implementation, Oct. 8, 2018, pp. 681-696.

Sun, He et al., "TrustICE: Hardware-Assisted Isolated Computing Environments on Mobile Devices", 2015 45th Annual IEEE/IFIP International Conference on Dependable Systems and Networks, Jun. 22, 2015, pp. 367-378.

Guan, Le et al., "Building a Trustworthy Execution Environment to Defeat Exploits from both Cyber Space and Physical Space for ARM", IEEE Transactions on Dependable and Secure Computing, vol. 16, No. 3, May 1, 2019 pp. 438-453.

Cicero, Giorgiomaria et al., "Reconciling Security with Virtualization: A Dual-Hypervisor Design for ARM TrustZone", 2018 IEEE International Conference on Industrial Technology Feb. 20, 2018, pp. 1628-1633.

Pinto, Sandro et al., "Demystifying Arm trustzone: A comprehensive survey", ACM Computing Surveys, vol. 51, No. 6, Article 130, Jan. 1, 2019.

Chai, Hongfeng et al., "TEEI—A Mobile Security Infrastructure for TEE Integration", 2014 IEEE 13th International Conference on Trust, Security and Privacy in Computing and Communications, Sep. 24, 2014, pp. 914-920.

"Measured Boot Process", retrieved from https://ebrary.net/24530/computer_science/measured_boot_process, and retrieved on Jan. 27, 2022, 4 pages.

Jain, Lavina et al., "Security Analysis of Remote Attestation", CS259 Project Report, 2008, 9 pages.

TPM 2.0 Library Specification, Trusted Computing Group (TCG), retrieved from https://trustedcomputinggroup.org/resource/tpm-library-specification, and retrieved on Jan. 27, 2022, 10 pages.

Coppola, Marcello et al., "Trusted Computing on Heterogeneous Embedded Systems-on-Chip with Virtualization and Memory Protection." Proceeding of the Fourth International Conference on Cloud Computing, GRIDs, and Virtualization, 2013, pp. 225-229.

Prehofer, C et al., "Towards Trusted Apps platforms for open CPS", 2016 3rd International Workshop on Emerging Ideas and Trends in Engineering of Cyber-Physical Systems (EITEC), IEEE, 2016, 8 pages.

* cited by examiner

SYSTEM AND METHOD FOR PERFORMING TRUSTED COMPUTING WITH REMOTE ATTESTATION AND INFORMATION ISOLATION ON HETEROGENEOUS PROCESSORS OVER OPEN INTERCONNECT

CROSS-REFERENCE TO RELATED APPLICATION

This application is the National Stage Entry of International Application No. PCT/CA2020/051115 filed Aug. 14, 2020, which claims priority to U.S. Provisional Application Ser. No. 62/887,678 filed Aug. 16, 2019, the entirety of which are incorporated by reference herein in their entireties.

BACKGROUND

Field of Invention

The present invention relates to system and method for performing trusted computing with remote attestation and information isolation on heterogeneous processors over open interconnects. Specifically, the present invention relates to secure and trusted computing architecture and operation method therefore. The present invention pertains to the assurance of authenticity, confidentiality and integrity of the executed programs, the analytic models and the processed data used by heterogeneous processing units such as graphic processing units (GPU), neural processing units (NPU) and video processing units (VPU), etc. that are connected to the central processing unit (CPU) through standard open interconnects such as Ethernet, USB and SPI, etc.

Description of Related Art

The idea of creating a domain with specific access rights to protect a cluster of heterogeneous processors was proposed in some study. However, that proposal requires the hardware design of a special network on chip (NoC), referred to as an NoC Firewall. In our invention, this requirement was mitigated by establishing a static association between a cluster of central processing unit with a heterogeneous processing unit. This simpler (and more restrictive) design eliminates the need of any hardware modification, and thus more amenable to existing embedded systems. The idea of instantiating three different execution environments to execute critical, trusted and un-trusted applications was proposed in some study. However, that proposal again mandated the use of a special network on chip, referred to as a write once, read many NoC, simply to allow the processors to be freely associated with different execution environments. By associating specific processors in a multi-processor system to each execution environments, this invention simplifies the mechanisms for Information Isolation and thus avoid the use of special on-chip hardware.

SUMMARY

This present invention disclosed both the computer architecture and the computing operation that can ensure authenticity, confidentiality and integrity of the programs executed, the deep learning (DL)/machine learning (ML) models used and the data processed by the heterogeneous processing units—abbreviated as XPUs with "X" referring to the various types of special processing units—including but not limited to graphic processing units (GPU), neural processing units (NPU), tensor processing units (TPU) and video processing units (VPU) that are connected to the central processing units (CPU) through standard open interconnects including but not limited to Ethernet, PCI, USB and SPI without the use of hardware memory management units (MMU) or bus arbitration/multiplexing units (BAU) to enforce information isolation.

The disclosed computer architecture and computing operation enable trusted computing to be performed on XPU as well as CPU with the protection of information isolation among the computing tasks and the support of remote attestation of the execution states of the CPU and the XPU. Different computing tasks can thus be performed on these processing units with the assurance of authenticity, confidentiality and integrity of their programs, DL/ML models and data.

This present invention first disclosed a computer operation method to establish a trusted rich execution environment (T-REE) in a virtual machine (VM) instantiated in an unprotected region on the system hardware platform consisting of one or more dedicated CPU and a dedicated region in the shared memory connected by a shared bus. With the security services provided by a trusted execution environment (TEE) established in a protected region on the system hardware platform consisting of one or more dedicated CPU, a crypto processor and a protected region in the memory, the T-REE provides authenticity, confidentiality and integrity protection to the programs, models and data processed in the T-REE in order to isolate them from the programs processed in the other T-REE similarly established and in the rich execution environments (REE) that operate without the security support from the TEE.

This present invention also disclosed a computer operation method to extend the information isolation protection offered by the T-REE, which is established among the dedicated CPU, to include the XPU, which is connected to the CPU via the open interconnect, after a successful completion of mutual authentication as well as a successful establishment of secure communication channels between the CPU and the XPU through their associated crypto processors.

This present invention also disclosed a computer operation method to perform remote attestation of the execution states of the XPU with the use of its associated crypto processor and through the secure communication established between the XPU and the dedicated CPU in the T-REE.

This invention requires the computer system to install two crypto processors and associate one with the dedicated CPUs while the other with the XPU. The two crypto processors must be able to perform the following security functions: (1) secure boot of software executing in the TEE and the T-REE; (2) mutual authentication between the dedicated CPU and the XPU; (3) secure communication offering data origin authentication, data confidentiality and data integrity protection between the dedicated CPU and the XPU.

This present invention also requires the computer system to have the standard capability to enforce the operating system functions of processor and interrupt affinity to the information exchanges over the open interconnect between the XPU and the CPU in order to direct those information exchanges to the dedicated CPU of the T-REE. This capability is a standard feature of operating systems.

This present invention also requires the computer system to have the standard capability to support secure information exchanges between the dedicated CPU in the T-REE and the dedicated CPU in the TEE that possesses the crypto processor. This capability is a basic feature of the GlobalPlatform TEE standard specification.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
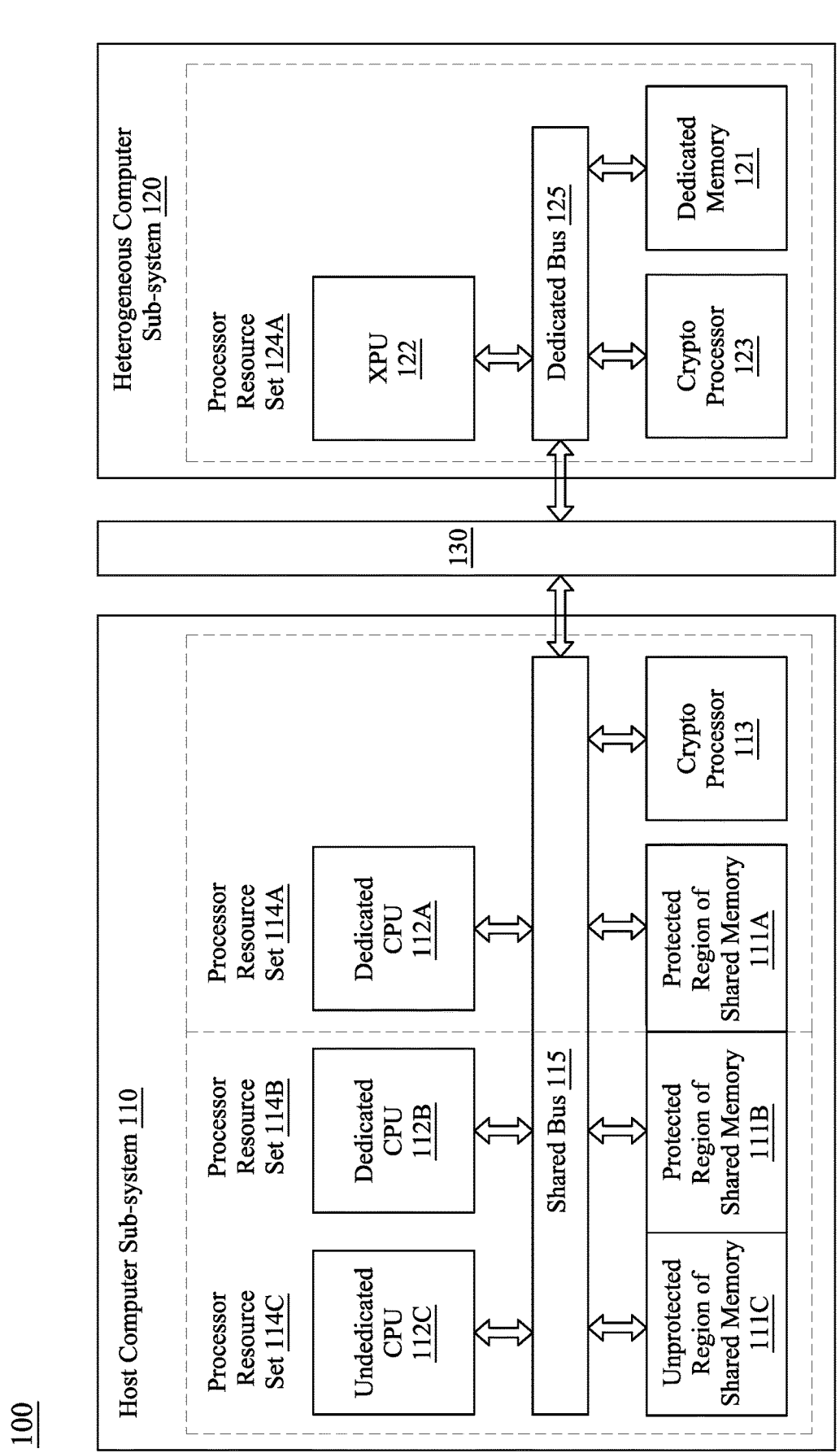
FIG. 1 is a schematic diagram illustrating a functional architecture of the heterogeneous computing system including a host computer sub-system, a heterogeneous computer sub-system and the open interconnect connecting the two sub-systems.

Reference will now be made in detail to the present embodiments of the invention, examples of which are illustrated in the accompanying drawings. Wherever possible, the same reference numbers are used in the drawings and the description to refer to the same or like parts. With the advent of internet of things (IoT), vast amount of data is being collected by various sensors and analyzed by computing nodes embedded in the environment. In this emerging paradigm of edge analytics, heterogeneous computing systems, known as edge computing nodes, equipped with CPU, GPU, NPU and VPU (referred collectively as XPU) are frequently used to perform real-time data analytics for multiple users near the source of data. The requirement to support multi-tenancy—i.e. the capability to allow multiple users to perform computing tasks on a common platform while preserving information privacy and sovereignty and complying with each user's usage policies—requires the heterogeneous computing system to enforce information isolation with the provision of data authenticity, confidentiality and integrity protection among the computing tasks of different users. However, due to the lack of hardware virtualization support among the embedded heterogeneous computing systems, system-level information isolation has not been adequately enforced among the edge computing nodes.

This present invention supplies a software system architecture and a procedural method to enforce information authenticity, confidentiality and integrity protection between CPUs and XPUs that exchange information through I/O channels without the use of sharing memory. The invention includes a method to establish a trusted rich execution environment (T-REE) as a virtual machine (VM) in the unprotected region on the hardware platform of a host computer equipped with CPU that can support confidential and trusted computing for general applications. It also includes a method to extend the protection coverage of the T-REE to include a heterogeneous computer equipped with XPUs that is connected to the host computer via an open interconnect. Finally, it includes a method to perform remote attestation to the states of both the CPUs on the host computer and the XPUs on the heterogeneous computer.

The following embodiments are about system architecture.

The reference is made to FIG. 1. FIG. 1 is a schematic diagram illustrating a functional architecture of the heterogeneous computing system 100 including a first device (as the host computer sub-system 110), a second device (as the heterogeneous computer sub-system 120) and the open interconnect 130. The heterogeneous computer sub-system 120 is statically connected to the host computer sub-system 110 through the open interconnect 130. The open interconnect 130 is defined as a communication channel implements standardized protocols to support bi-directional information interchanges between two devices. The open interconnect 130 includes but not limited to the standard communication channels such as Ethernet, USB and SPI, that can be used simultaneously by multiple sub-systems to conduct information exchanges without intrinsic data protection.

As shown in FIG. 1. The host computer sub-system 110 includes a first dedicated processor (as a dedicated central processing unit (CPU) 112A shown in FIG. 1), a second dedicated processor (as a dedicated CPU 112B shown in FIG. 1), a first undedicated processor (as a undedicated CPU 112C shown in FIG. 1), a shared bus 115, a first crypto processor (as a crypto processor 113 shown in FIG. 1), a first protected memory segment (as a protected region of shared memory 111A shown in FIG. 1), a second protected memory segment (as a protected region of shared memory 111B shown in FIG. 1), a first unprotected memory segment (as an unprotected region of shared memory 111C shown in FIG. 1). The shared bus 115 is connected with the open interconnect 130. The dedicated CPU 112A, the crypto processor 113, the protected region of shared memory 111A, the protected region of shared memory 111B and the unprotected region of shared memory 111C are connected with the shared bus 115.

The protected region of shared memory 111A and 111B are protected by memory encryption performed by the crypto processor 113 or access control enforced by memory management hardware integrated into the shared memory.

With respect to the host computer sub-system 110, the first crypto processor 113 is configured to perform the following two sets of functions. As a hardware root-of-trust, it can perform a secure boot of the system software and a remote attestation of the states of the CPU and the shared memory to a remote attestator. As a cryptographic processor, it can provide confidentiality and integrity protection to the data stored in the protected regions of the shared memory.

With respect to the interactions between the host computer sub-system 110 and the heterogeneous computer sub-system 120, the first crypto processor 113 is configured to perform the mutual authentication between the two sub-systems. It is also configured to provide confidentiality, integrity and authentication protection to the transfer of programs, models and data over the open interconnect 130.

The host computer sub-system 110 and the heterogeneous computer sub-system 120 shall transport programs, models and data through the open interconnect 130.

The heterogeneous computer sub-system 120 includes a third dedicated processor (as a heterogeneous processing unit (XPU) 122 shown in FIG. 1), a dedicated bus 125, a second crypto processor (as a crypto processor 123 shown in FIG. 1) and a dedicated memory 121 used by the XPU 122. The XPU 122, the crypto processor 123 and the dedicated memory 121 are connected internally through a dedicated bus 125.

The crypto processor 123 in the processing resource set 124A is configured to perform mutual authentication between the heterogeneous computer sub-system 120 and the host computer sub-system 110, and is configured to provide confidentiality, integrity and authentication protection to programs, model and data transferred over the open interconnect 130.

Furthermore, the elements in the host computer sub-system 110 of the system 100 can be divided according to their execution environments into a first processing resource set (as the processing resource set 114A shown in FIG. 1), a second processing resource set (as the processing resource set 114B shown in FIG. 1) and a third processing resource set (as the processing resource set 114C shown in FIG. 1). The elements in the heterogeneous computer sub-system 120 of the system 100 can be divided into a fourth processing resource set (as a processing resource set 124A shown in FIG. 1).

The processing resource set 114A includes dedicated CPU 112A, the first protected region of shared memory 111A and the crypto processor 113. They are in a protected region in the host computer sub-system 110. The protection of the resources in this region shall be implemented in hardware so that the first processor resource set 114 can function as the hardware root-of-trust for the entire heterogeneous computing system 100.

The processing resource set 114B includes dedicated CPU 112B and the protected region of shared memory 111B. They are in an unprotected region in the host computer sub-system 110. The protection of the resources in this region can be implemented by software executed in dedicated CPU 112B and the processing resource set 114A.

The processing resource set 114C includes the undedicated CPU 112C and the unprotected region of shared memory 111C. They are also in an unprotected region in the host computer sub-system 110. No protection of the resources in this region is implemented.

The fourth processing resource set 124A includes XPU 122, the dedicated bus 125, the crypto processor 123 and the dedicated memory 121. They are in a dedicated region in the heterogeneous computer sub-system 120. The protection of the resources in this region is implemented by the combination of the physical isolation of the heterogeneous computer sub-system 120 and the confidentiality, integrity and authentication protection provided to the exchanges conducted over the open interconnect 130.

The following embodiments are about structural and functional differences between a trusted execution environment (TEE) and a trusted rich execution environment (T-REE).

Figure 2:
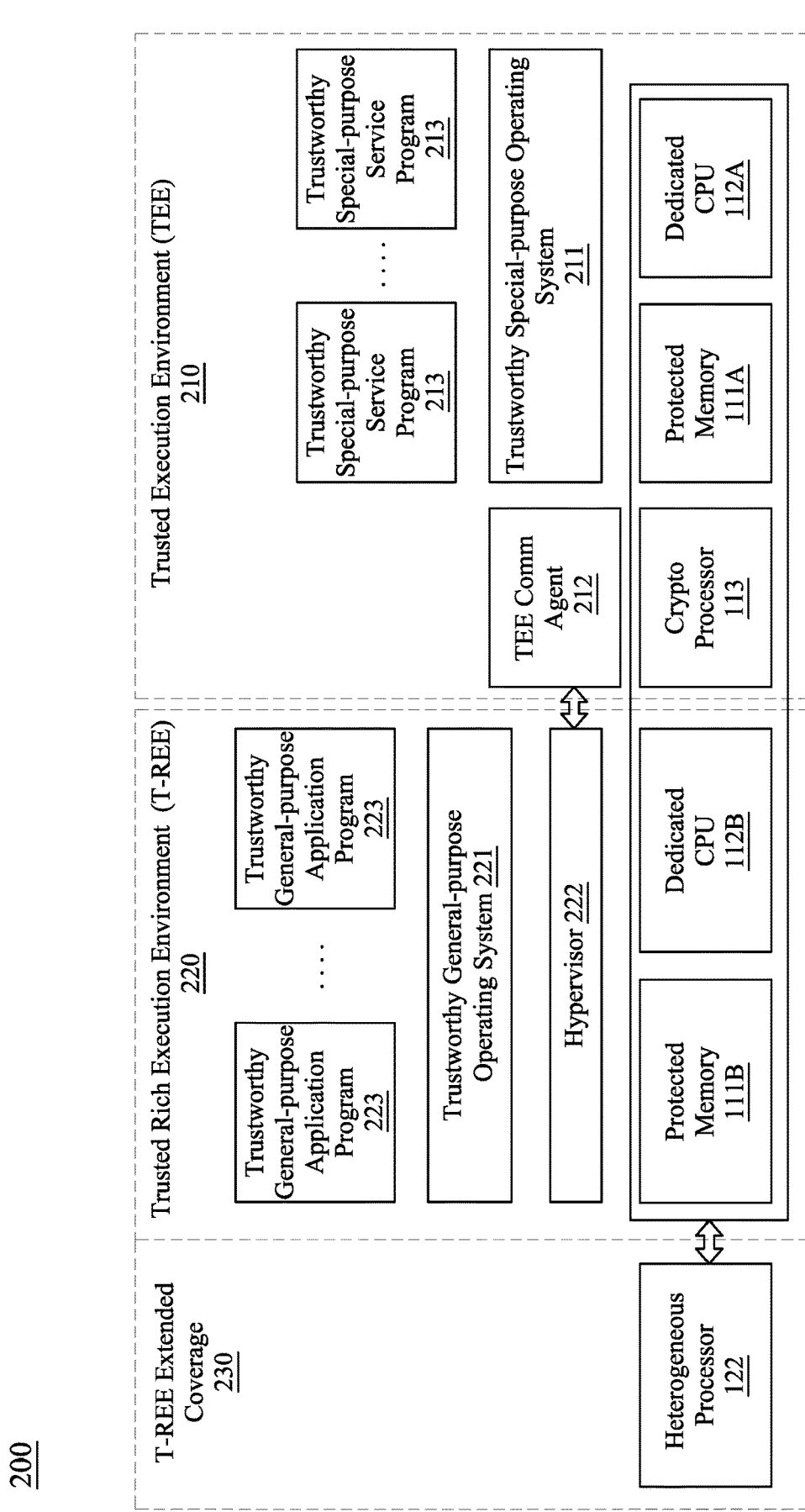
FIG. 2 is a schematic diagram illustrating a software architecture of the heterogeneous computing system, especially the three distinct execution environments: the trusted execution environment (TEE), the trusted rich execution environment (T-REE) and the extended coverage of the T-REE, along with the hardware platform and the hypervisor.

The reference is made to FIG. 2. FIG. 2 is a schematic diagram illustrating a software architecture 200 of the heterogeneous computing system 100, especially the three distinct execution environments: the trusted execution environment (TEE) 210, the trusted rich execution environment (T-REE) 220 and the extended coverage 230 of the T-REE 220, along with the hypervisor 222 and the hardware platform. It is noted that, the unprotected rich execution environment (REE) was not shown in this figure since it is not a part of the invention. Programs running and data processed in the REE instantiated in the processing resource set 114C are not protected with confidentiality, integrity or authentication services.

As shown in FIG. 2, the processing resource set 114A in a protected region on the hardware platform of the host computer sub-system 110 is configured to instantiate a trusted execution environment (TEE) 210. The processing resource set 114B in an unprotected region of the hardware platform is configured to instantiate a trusted-rich execution environment (T-REE) 220. The processing resource set 114C in an unprotected region of the hardware platform is configured to instantiate a rich execution environment (REE) 220 (not shown). A general-purpose operating system is executed in a REE instantiated in a processing resource set 114C.

The TEE 210 comprises a trust special-purpose operating system 211, a TEE communication agent 212 and one or more trustworthy special-purpose service program 213. The trustworthy special-purpose operating system 211 is executed in the trusted execution environment 210. The trustworthy special-purpose service programs 213 are running with the support of the trustworthy special-purpose operating system 211 in the trusted execution environment 210.

The trusted execution environment 210 is a software execution environment for performing special-purpose security functions. The TEE 210 is instantiated in a protected region of the hardware platform of a device, and runs a trustworthy special-purpose operating system.

The T-REE 220 comprises a hypervisor 222, a trustworthy general-purpose operating system 221 and one or more trustworthy general-purpose application programs 223. Wherein the T-REE 220 is instantiated as a virtual machine in the processing resource set 114B. The trustworthy general-purpose operating system 221 is executed in the T-REE 220. The trustworthy general-purpose application programs 223 are running with the support of the trustworthy general-purpose operating system 221 in the T-REE 220.

The T-REE 220 is a software execution environment for executing trustworthy general-purpose application programs. The T-REE 220 is instantiated as a virtual machine in an unprotected region of the hardware platform of a device and runs a trustworthy general-purpose operating system 221.

The trustworthy general-purpose application programs 223 are software program with authenticity and integrity of the program verified by a trusted organization and certified with its digital signatures. The output of the trustworthy general-purpose application programs 223 can be trusted to be free from malicious alteration when it is executed in a T-REE 220.

The trustworthy general-purpose operating system 221 is an operating system constructed to support the execution of trustworthy general-purpose application programs 223. The authenticity and integrity of the object code of the trustworthy general-purpose operating system 221 are verified by trusted organizations and certified with digital signatures of the object code. The trustworthy general-purpose operating system 221 is loaded into a T-REE 220 in a second secure boot process and the trustworthy general-purpose operating system 221 is initiated during the instantiation of the T-REE virtual machine and performed by the security functions running in the TEE 210.

The trustworthy special-purpose service program 213 is a program with its authenticity and integrity of the program, verified by a trusted organization and certified with its the digital signatures of the trusted organization, and the trustworthy special-purpose service program 213 performs cryptographic or security functions; wherein the output of the trustworthy special-purpose service program 213 is trusted to be free from malicious alteration when the trustworthy special-purpose service program is executed in a TEE 210.

The following embodiments describe the establishment of the trusted execution environment (TEE) 210 and the trusted rich execution environment (T-REE) 220.

Figure 3:
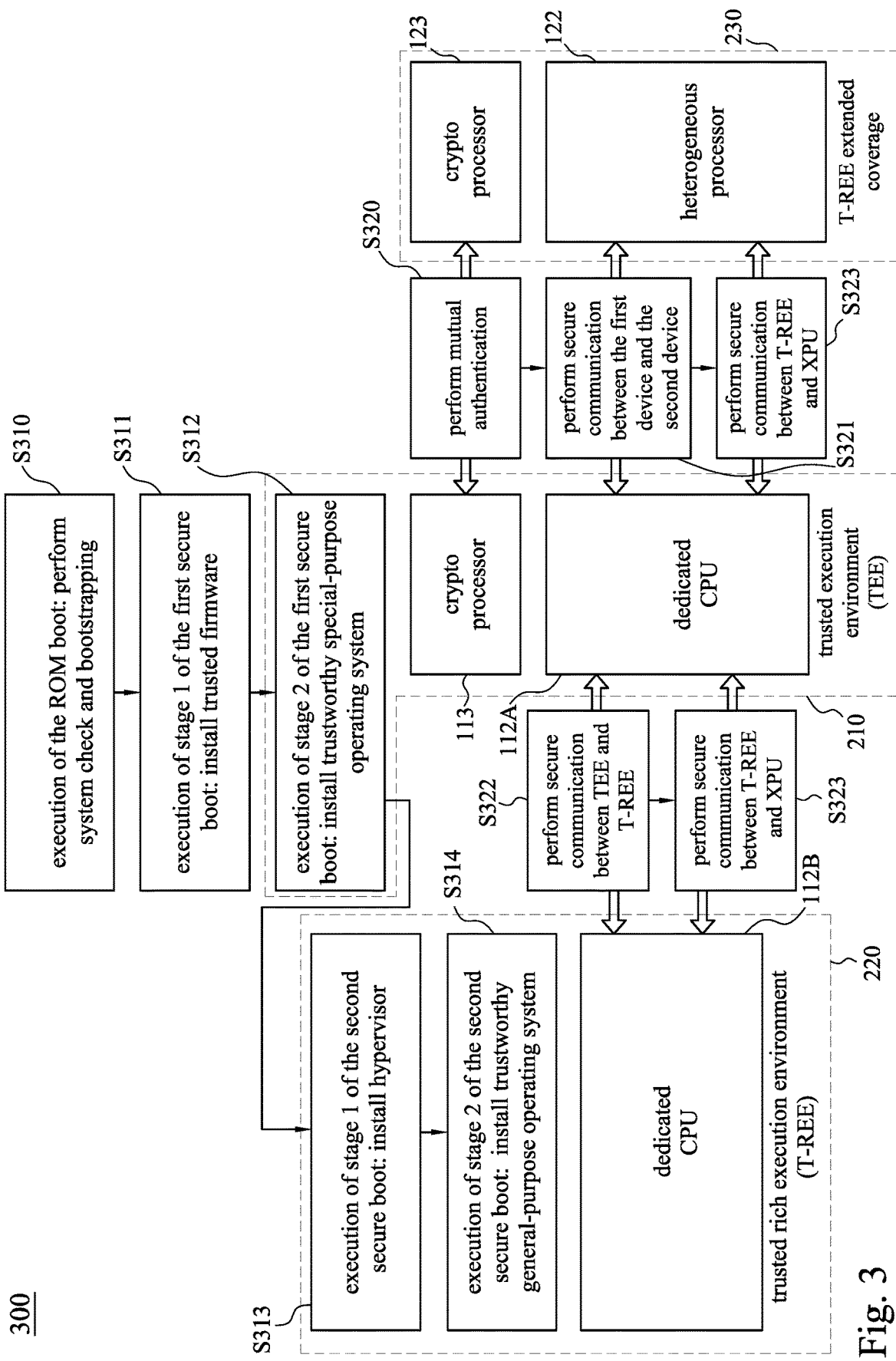
FIG. 3 is a flow chart illustrating a boot sequence to instantiate the trusted execution environment (TEE) and the trusted rich execution environment (T-REE) from a system power up or reset and the extension of T-REE coverage to include XPU after successful completion of mutual authentication and establishment of secure communication between the CPU and the XPU.

The reference is made to FIG. 3. The FIG. 3 is a flow chart illustrating a boot sequence to instantiate the TEE 210 and the T-REE 220 from a system power up or reset and then the extension of T-REE 220 coverage to include the heterogeneous computer sub-system 120 after a successful completion of mutual authentication between the host computer sub-system 110 and the heterogeneous computer sub-system 120 as well as the establishment of secure communication between the dedicated CPU 112B and the dedicated CPU 112A and the XPU 122.

The following steps are provided to establish the trusted execution environment (TEE) 210. The TEE 210 runs a trustworthy special-purpose operating system 211 instantiated in a processing resource set 114A in a protected region of the hardware platform in the host computer sub-system 110 during a secure boot initiated by the crypto processor 113 after a power-up or a system reset of the host computer sub-system 110.

A secure boot is a mechanism to check the authenticity and integrity of system firmware and software by verifying a digital signature of the hashed value of the object code issued by a trusted organization other than the provider and the consumer of the object code.

The processing resource set 114A includes a dedicated processor 112A and a protected region of shared memory 111A and a crypto processor 113 in the host computer sub-system 110. The crypto processor 113 is configured to perform the first secure boot of the trustworthy special-purpose operating system 211 in the TEE 210, and is configured to provide confidentiality and integrity protection to data stored in the protected segments in the shared memory.

Step 310, execution of the ROM boot: this step performs the system check and initiates the bootstrapping process.

Step 311, execution of stage 1 of the first secure boot: this step installs the trusted firmware into the processing resource set 114A.

Step 312, execution of stage 2 of the first secure boot: this step performs the verification and the installation of the trustworthy special-purpose operating system 211 into the processing resource set 114A. The trustworthy special-purpose operating system is an operating system constructed to support the execution of cryptographic and security functions according to standard operating procedures. The authenticity and integrity of the object code of the trustworthy special-purpose operating system are verified by a trusted organization and certified with digital signatures of the object code. The trustworthy special-purpose operating system is loaded into in the first processing resource set in the first secure boot process, which verifies the digital signatures of the object code of the trustworthy special-purpose operating system during a power-up or reset of the host computer sub-system. The TEE 210 is established after the successful completion of the stage 2 of the first secure boot.

The following steps are provided to establish the trusted rich execution environment (T-REE) 220. The T-REE 220, which runs a trustworthy general-purpose operating system 221, is instantiated as a virtual machine in a processing resource set 114B in an unprotected region of the hardware platform in the host computer sub-system 110; wherein the processing resource set 114B includes a second dedicated processor 112B and the protected region of shared memory 111B.

Step 313, execution of stage 1 of the second secure boot: this step installs a hypervisor.

Step 314, execution of stage 2 of the second secure boot: this step performs the verification and the installation of the trustworthy general-purpose operating system 221 in the processing resource set 114B. The trustworthy general-purpose operating system 221 is installed in the stage 2 of a second secure boot after the successful completion of the first secure boot of the TEE 210, wherein the trustworthy general-purpose operating system is authenticated through the verification of its digital signatures generated by a trusted organization and thus trusted by the trustworthy special-purpose operating system 211 in the TEE 210. The T-REE 220 is established after the successful completion of the stage 2 of the second secure boot.

As a result, the program, models and data stored in the protected region of shared memory 111A in the processing resource sets 114A used by the TEE 210 and the program and data stored in the protected region of shared memory 111B in the processing resource set 114B used by the T-REE 220 are protected with confidentiality and integrity services.

Also, the programs, models and data transported between the TEE 210 and the T-REE 220 through the TEE communication agent 212 in the host computer sub-system 110 is protected by confidentiality, integrity and authentication services.

The following embodiments describe the extension of the coverage of the T-REE 220 through the establishment of secure information exchanges between the dedicate CPU 112B and the heterogeneous processor (XPU) 122.

In step S320, a mutual authentication procedure is performed between the crypto processor 113 in the processing resource set 114A in the host computer sub-system 110 and the crypto processor 123 in the processing resource set 124A in the heterogeneous computer sub-system 120. As a result, a trusted relation is established between the host computer sub-system 110 and the heterogeneous computer sub-system 120.

In step S321, a secure communication is established between the dedicated CPU 112A in the host computer sub-system 110 and the XPU 122 in the heterogeneous computer sub-system 120. The secure communication is protected with confidentiality, integrity and authentication services offered by the crypto processor 113 in the host computer sub-system 110 and the crypto processor 123 in the heterogeneous computer sub-system 120 after the successful completion of mutual authentication between the two sub-systems 110 and 120.

In step S322, a secure communication is established between the TEE 210 and the T-REE 220. The secure communication is conducted between the dedicated CPU 112A in the processing resource set 114A, in which the TEE 210 was established, and the dedicated CPU 112B in the processing resource set 114B, in which the T-REE 220 was established. The secure communication is protected with confidentiality, integrity and authentication services.

In step S323, a secure communication is established between the T-REE 220 and the heterogeneous computer sub-system 120 through the TEE 210. The secure communication is conducted between the dedicated CPU 1126 in the processing resource set 114B, in which the T-REE 220 was established, and the XPU 122 in the heterogeneous computer sub-system 120 through the secure communication between the crypto processor 113 in the processing resource set 114A, in which the TEE 210 was established, in the host computer sub-system 110 and the crypto processor 123 in the heterogeneous computer sub-system 120. The secure communication is protected with confidentiality, integrity and authentication services.

After the successful establishment of secure communication between the heterogeneous computer sub-system 120 and the T-REE 220 through the TEE 210, the heterogeneous computer sub-system 120 is included in the extended coverage of the T-REE 220.

After the successful establishment of secure communication between the heterogeneous computer sub-system 120 and the T-REE 220 through the TEE 210, the state of program execution in the XPU 122 in the heterogeneous computer sub-system 120 can be made verifiable by the generation of a signed hashed value of the content of the dedicated memory 121 using the crypto processor 123 and then followed by the transportation of the signed hashed value from the heterogeneous computer sub-system 120 to the processing resource set 114B, in which T-REE was established, in the host computer sub-system 110.

In response to the T-REE 220 is idle or deactivated, the virtual machine in which the T-REE 220 was instantiated is terminated and the processing resource set 114B is released whereas the dedicated processor 112B becomes an undedicated processor and the protected region of shared memory 111B becomes a part of the unprotected memory.

It will be apparent to those skilled in the art that various modifications and variations can be made to the structure of the present invention without departing from the scope or the spirit of the invention. In view of the foregoing, it is intended that the present invention cover modifications and variations of this invention provided they fall within the scope of the following claim.

What is claimed is:

1. A system, comprising:
 a first device comprising:
  a first processing resource set in a protected region of a hardware platform, comprising a first dedicated processor and a first crypto processor and a first protected memory segment; and
  a second processing resource set in an unprotected region of the hardware platform, comprising a second dedicated processor and a second protected memory segment; wherein,
  a trustworthy special-purpose operating system is executed in a trusted execution environment (TEE) instantiated in the first processing resource set, wherein a first trustworthy special-purpose service program is running with the support of the trustworthy special-purpose operating system in the trusted execution environment (TEE); and
  a trustworthy general-purpose operating system is executed in a trusted rich execution environment (T-REE) instantiated in the second processing resource set, wherein a first trustworthy general-purpose application program is running in the trusted rich execution environment (T-REE) with the support of the trustworthy special-purpose operating system, wherein the trusted rich execution environment (T-REE) is instantiated as a virtual machine in the second processing resource set, wherein, in response to the trusted rich execution environment (T-REE) is idle or deactivated, the virtual machine in which the trusted rich execution environment (T-REE) was instantiated is terminated and the second processing resource set is released whereas the second dedicated processor becomes an undedicated processor and the second protected memory segment becomes a part of a unprotected memory.

2. The system of claim 1, wherein data transported between the trusted execution environment (TEE) instantiated in the first processing resource set and the trusted rich execution environment (T-REE) instantiated in the second processing resource set are protected with confidentiality, integrity and authentication services; and
 wherein a program and a data stored in the first protected memory segment in the first processing resource sets used by the trusted execution environment (TEE) and another program and another data stored in the second protected memory segment in the second processing resource set used by the trusted rich execution environment (T-REE) are protected with confidentiality and integrity services.

3. The system of claim 1, wherein the first device further comprises a third processing resource set in an unprotected region of the hardware platform comprising a first undedicated processor and a first unprotected memory segment; and
 wherein a general-purpose operating system is executed in a rich execution environment (REE) instantiated in a third processing resource set.

4. The system of claim 3, wherein programs running and data processed in the rich execution environment (REE) instantiated in a third processing resource set are not protected with confidentiality, integrity or authentication services.

5. The system of claim 1, wherein the first device further comprises a shared bus connected with an open interconnect, wherein the first protected memory segment, the second protected memory segment and a first unprotected memory segment are connected with the shared bus, and wherein the first crypto processor connected with the shared bus.

6. The system of claim 1 further comprising:
 a second device, and wherein the second device is statically connected to the first device through an open interconnect, and wherein the second device comprises:
 a fourth processing resource set in a protected region of the hardware platform, wherein the fourth processing resource set comprises a third dedicated processor and a second crypto processor and a dedicated memory.

7. The system of claim 6, wherein the second device further comprises a dedicated bus connected with the open interconnect, the dedicated memory connected with the dedicated bus, and a second crypto processor connected with the dedicated bus, wherein,
 the first crypto processor in the first processing resource set is configured to perform mutual authentication between the first device and the second device, and is configured to provide confidentiality, integrity and authentication protection to data transfer over the open interconnect; and
 the second crypto processor in the fourth processing resource set is configured to perform mutual authentication between the first device and the second device, and is configured to provide confidentiality, integrity and authentication protection to data transferred over the open interconnect.

8. The system of claim 6, wherein the open interconnect is a communication channel implements standardized protocols to support bi-directional information interchanges between two devices.

9. The system of claim 1, wherein the trusted execution environment (TEE) is a software execution environment for performing special-purpose security functions, wherein the TEE is instantiated in a protected region of the hardware platform of a device, and runs a trustworthy special-purpose operating system.

10. The system of claim 1, wherein the trusted rich execution environment (T-REE) is a software execution environment for executing trustworthy general-purpose application programs, wherein the T-REE is instantiated as a virtual machine in an unprotected region of the hardware platform of a device and runs the trustworthy general-purpose operating system.

11. The system of claim 1, wherein the trustworthy special-purpose operating system is an operating system constructed to support execution of cryptographic and security functions according to standard operating procedures, wherein authenticity and integrity of object code of the trustworthy special-purpose operating system are verified by a trusted organization and certified with digital signatures of object code, wherein the trustworthy special-purpose operating system is loaded into a trusted execution environment (TEE) in a first secure boot process, and the trustworthy special-purpose operating system is initiated during power-up or reset of device and verifies digital signatures.

12. The system of claim 1, wherein the trustworthy general-purpose operating system is an operating system constructed to support execution of trustworthy general-purpose application programs, wherein authenticity and integrity of object code of the trustworthy general-purpose operating system are verified by a trusted organization and certified with digital signatures of object code, wherein the trustworthy general-purpose operating system is loaded into a trusted rich execution environment (T-REE) in a second secure boot process and the trustworthy general-purpose operating system is initiated during instantiation of T-REE virtual machine and performed by security functions running in the TEE.

13. The system of claim 1, wherein the first trustworthy special-purpose service program is a program with authenticity and integrity of program, verified by a trusted organization and certified with the digital signatures of trusted organization, and the first trustworthy special-purpose service program performs cryptographic or security functions, wherein output of the first trustworthy special-purpose service program is trusted to be free from malicious alteration when the first trustworthy special-purpose service program is executed in the trusted execution environment (TEE).

14. The system of claim 1, wherein the first trustworthy general-purpose application program is a program with authenticity and integrity of program, verified by a trusted organization and certified with its digital signatures, wherein output of the first trustworthy general-purpose application program is trusted to be free from malicious alteration when it is executed in the trusted rich execution environment (T-REE).

15. A method comprising:
establishing a trusted execution environment (TEE) comprising a trustworthy special-purpose operating system, instantiated in a first processing resource set in a protected region of a hardware platform in a first device, during a first secure boot initiated by a first crypto processor after a power-up or a system reset of the first device, wherein the first processing resource set comprises a first dedicated processor and a first protected memory segment and the first crypto processor; and establishing a trusted rich execution environment (T-REE) comprising a trustworthy general-purpose operating system, instantiated as a virtual machine in a second processing resource set in an unprotected region of the hardware platform in the first device, during a second secure boot after the successful first secure boot of the trusted execution environment (TEE) in the first processing resource set, wherein the second processing resource set comprises a second dedicated processor and a second protected memory segment, wherein the trusted rich execution environment (T-REE) is instantiated as a virtual machine in the second processing resource set, wherein, in response to the trusted rich execution environment (T-REE) is idle or deactivated, the virtual machine in which the trusted rich execution environment (T-REE) was instantiated is terminated and the second processing resource set is released whereas the second dedicated processor becomes an undedicated processor and the second protected memory segment becomes a part of a unprotected memory.

16. The method of claim 15, wherein the trustworthy general-purpose operating system in the trusted rich execution environment (T-REE) in the first device is instantiated through the second secure boot after successful completion of the first secure boot of the trusted execution environment, wherein the trustworthy general-purpose operating system is authenticated through verification of digital signatures generated by a trusted organization and trusted by the trustworthy special-purpose operating system in the trusted execution environment (TEE).

17. The method of claim 15, wherein data transported between the trusted rich execution environment (T-REE) and the trusted execution environment (TEE) through a TEE communication agent in the first device is protected by confidentiality, integrity and authentication services.

18. The method of claim 15, further comprising:
establishing a trusted relation between the first device and a second device, after the successful establishment of a trusted execution environment (TEE) in the first processing resource set in the first device, by performing a mutual authentication procedure between the first crypto processor in the first processing resource set in the first device and a second crypto processor in a fourth processing resource set in the second device.

19. The method of claim 15, further comprising:
establishing secure communication with confidentiality, integrity and authentication protection between the first crypto processor in the first device and a second crypto processor in a second device after the successful completion of mutual authentication between the first device and the second device.

20. The method of claim 15, further comprising:
establishing secure transport of program and data between the second dedicated processor in the second processing resource set in the first device and a third dedicated processor in a fourth processing resource set on a second device with confidentiality, integrity and authentication protection through secure transport between the first crypto processor in the first processing resource set in the first device and a second crypto processor in the fourth processing resource set in the second device.

21. The method of claim 15, wherein,
state of program execution in a third dedicated processor in a fourth processing resource set in a second device is verified by the generation of signed hashed value of content of the dedicated memory using a second crypto processor and then followed by the transportation of the signed hashed value from the third dedicated processor on the second device to the second dedicated processor in the second processing resource set in the first device, wherein the trusted rich execution environment (T-REE) is instantiated in the second processing resource set.

22. The method of claim 15, wherein,
a first crypto processor in the first device is configured to perform the first secure boot of the trustworthy special-purpose operating system in the trusted execution environment (TEE), and is configured to perform mutual authentication between the first device and a second device, and is configured to provide confidentiality and integrity protection to data stored in the protected segments in the shared memory and provide confidentiality, integrity and authentication protection to data transfer over a shared bus and an open interconnect; and a second crypto processor is configured to perform mutual authentication between the first device and the second device, and is configured to provide confidentiality, integrity and authentication protection to data transferred over the open interconnect.

23. The method of claim 15, wherein the first secure boot and the second secure boot are mechanism to check authenticity and integrity of system firmware and software by verifying a digital signature of hashed value of object code issued by a trusted organization distinguished from provider and consumer of the object code.

* * * * *